United States Patent Office 2,959,581
Patented Nov. 8, 1960

2,959,581
STABILIZATION OF SULFURIZED HYDROCARBONS

Roy C. Sias, Ponca City, Okla., assignor to Continental Oil Company, Ponca City, Okla., a corporation of Delaware No Drawing. Filed June 25, 1958, Ser. No. 744,331

20 Claims. (Cl. 260—139)

This invention relates to an improved method for preparing sulfurized hydrocarbons. More particularly, this invention relates to an improved method for stabilizing sulfurized olefinic hydrocarbons to render the materials less corrosive to metals.

Sulfurized hydrocarbons are extremely valuable additives for various hydrocarbon products. They are particularly useful as antioxidants and corrosion inhibitors for various types of lubricants. One serious disadvantage often encountered with these materials, however, is the presence of loosely bound or corrosive sulfur in the sulfurized hydrocarbon.

Various methods have been proposed by the prior art to alleviate the problem caused by these corrosion-producing impurities. Sulfurization within certain critical limits of temperature and time has been employed. For example, Herschel G. Smith in U.S. 2,179,060 maintains the temperature at 340±5° F. for from 16 to 24 hours. Another general method used in the prior art involves treatment of the sulfurized product with dry or aqueous sodium sulfide. A serious disadvantage with the use of sodium sulfide is the emulsion difficulties encountered. Manteuffel et al. in U.S. 2,655,469 overcome this emulsion problem by adding dry sodium sulfide and sodium hydroxide to the sulfurized organic compound and then steam distilling under certain critical conditions.

The present invention obviates the difficulties encountered in the prior art and provides a convenient, economical method for stabilizing sulfurized hydrocarbons. More specifically, the present invention overcomes the emulsion difficulties usually encountered when sodium sulfide is used by incorporating a heating step after removal of excess sulfurization agent, which is then followed by a sodium sulfide wash. It is this combination of heating step and sulfide wash followed by a water wash which enables the present process to overcome the difficulties previously encountered.

The present invention provides a process for preparing sulfurized hydrocarbons which are less corrosive to metals, said process including the steps of (a) heating the sulfurized product after removal of any excess sulfurization agent for up to 4 hours under an inert atmosphere at temperatures of 10 to 100° C. above the temperature of sulfurization, (b) contacting the heat-treated sulfurized product, after cooling to about 100° C., with aqueous alkali sulfide solutions for up to 4 hours at reflux temperatures, (c) washing the product with hot water until substantially free of alkali sulfide, and (d) removing the water.

As a preferred and specific embodiment of the present invention, a sulfurized wax olefin, after removal of excess sulfurization agent, is heated to 175–200° C., which is 10–35° C. above the temperature of sulfurization, under an inert atmosphere for 3 hours, after which the material is cooled to about 100° C. and contacted with an equal volume of 15% aqueous sodium sulfide for 1 to 4 hours at reflux temperature. The reaction mixture is allowed to settle, and the aqueous sodium sulfide layer is removed. The product is then washed with water until the washings are substantially free of sodium sulfide. Residual water is removed from the product by gravity settling for about 24 hours at 70–90° C. Alternatively, the water may be removed by heating the product to as high as 150° C. The sulfurized product is then filtered or, alternatively, treated with 1–5% (wt.) of Filtrol clay at 100–120° C. and then filtered, employing a filter aid such as Hyflo.

The term "sulfurized hydrocarbon" as used herein refers to materials prepared by reaction of an essentially hydrocarbon material with a "reactive sulfur-containing material" including elemental sulfur or sulfur halides, such as sulfur monochloride or sulfur dichloride, mixture of these materials, and the like.

The essentially hydrocarbon materials used in preparing the sulfurized hydrocarbons may be olefins or olefin-containing petroleum fractions, such as cracked cycle stocks or waxes, solvent extracts of olefinic petroleum fractions, and the like. Monoolefins are particularly desirable materials. Examples of monoolefins include isobutylene, decene, dodecene, cetene (C16), octadecene (C18), cerotene (C26), melene (C30), olefinic extracts from gasoline or gasoline itself, cracked cycle stocks and polymers thereof, cracked waxes, dehydrohalogenated chlorinated waxes, and any mixed high molecular weight alkenes obtained by cracking petroleum oils. A preferred class of olefins are those containing from 18 to 24 carbon atoms per molecule. Such olefins may be prepared by the dehydrohalogenation of a halogenated paraffin hydrocarbon such as wax.

The term "inert atmosphere" as used herein refers to an atmosphere essentially free of elemental oxygen. In order to obtain this condition, we use gases such as, for example, nitrogen, carbon dioxide, or natural gas, which is predominately methane. Because of its availability and cost, natural gas is preferred.

The reaction of the hydrocarbon material with sulfur or reactive sulfur-containing materials may be conducted by procedures well known in the art. For example, the hydrocarbon may be diluted with an equal volume of a light paraffinic mineral oil and then treated with from 5–25% (wt.) of sulfur or reactive sulfur-containing compounds for 2–15 hours or more at a temperature above 90° C. and up to about 200° C. followed by the removal of excess sulfurizing agent.

Suitable temperatures for heating the sulfurized product, after removal of any excess sulfurization agent, are from 10 to 100° C. above the temperature of sulfurization. Preferred temperatures for conducting this phase of the process are 10 to 35° C. above temperature of sulfurization.

Below are given detailed descriptions of preparations of sulfurized hydrocarbons prepared and treated in accordance with the present invention. It is to be understood that the examples are given as illustrative only and are not to be construed as limiting the scope of the invention in any way.

Example 1

Product A was prepared by dissolving 500 g. of wax olefin (iodine number=109; 1.61 double bonds per molecule) in 500 g. of a paraffinic mineral oil having an SSU viscosity of 170 at 100° F. To this was added 74.2 g. of elemental sulfur and the reaction temperature maintained at about 165° C. for about 3 hours. To insure removal of any excess sulfurizing agent, the crude reaction product was cooled to 120° C., treated with 5% (weight) Filtrol clay for 30 minutes, and filtered through Hyflo filter aid at about 70 to 80° C. This product contained 6.2% (weight) sulfur.

*Example II*

A portion of product A was heated for 4 hours at 175 to 180° C. under an atmosphere of natural gas. The product was cooled to 100° C. and contacted with an equal volume of 15% (weight) aqueous sodium sulfide solution for 4 hours at reflux temperature. The reaction mixture was allowed to settle, and the aqueous sodium sulfide layer was removed. The product was washed twice with an equal amount of hot water, after which it was allowed to gravity settle for about 24 hours at 70 to 90° C. to remove the last traces of water. The sulfurized product was then treated with 5% (weight) of Filtrol clay at 100 to 120° C. and filtered through Hyflo filter aid. The product was designated B.

*Example III*

Using another portion of product A the procedure of Example II was followed with the exception that the last traces of water were removed from the sulfurized product by heating the product to a temperature of 150° C. for about 30 minutes.

*Example IV*

Equal portions of product A were heated for 1, 2, and 3 hours respectively at 175 to 180° C. under an atmosphere of natural gas. At the end of the respective time periods, each sample was cooled to 100° C. and contacted with an equal volume of 15% (weight) aqueous sodium sulfide solution for 1 hour under reflux conditions. The reaction mixture was then gravity settled. After removal of the sulfide layer, the organic layer was washed with hot water until the washings were substantially free of sulfide then gravity settled at about 80° C. for 24 hours. The products obtained were then analyzed for completeness of water removal with the following results:

| Heating time, hours: | Wt. percent residual water in product |
|---|---|
| 1 | 15.0 |
| 2 | 2.5 |
| 3 | Nil |

*Example V*

A portion of product A was heated for 4 hours at 175 to 180° C. under an atmosphere of natural gas, cooled to 120° C., treated with 5% (weight) Filtrol clay, and then filtered through Hyflo filter aid. The product was designated C.

*Example VI*

In another experiment, equal portions of product A were treated for 2, 4, and 6 hours respectively with 15% (weight) of dry sodium sulfide at 150° C. under an atmosphere of natural gas. At the end of the respective time periods, each sample was cooled to 100° C. and contacted with an equal volume of hot water at reflux temperature. The reaction mixture was then gravity settled at 80° C. for about 24 hours. Upon inspection, each sample was emulsified and could not be processed.

*Example VII*

The corrosion characteristics of the product described in Examples I, II, and V above were determined in accordance with the well known copper-strip test. The procedure employed was as follows: A copper strip (9 x 76 x 0.5 mm.) which had been polished with steel wool and weighed, was one-half immersed in a tube containing 100 ml. of the test blend. The test blend contained 2.3% (weight) of sulfurized wax olefin in a paraffinic mineral oil having an SSU viscosity of 170 at 100° F. The tube containing the test blend and copper strip was placed in a constant temperature bath, maintained at 132±1° C., and the bath operated on a cycle of 8 hours on and 16 hours off for 7 days. At the end of the 7 days, the copper strip was removed, washed with naphtha, dried, washed with aqueous ammonia, wiped with adsorbent tissue, and weighed. The difference in weight is the corrosion loss, reported as mg./mm.$^2$.

The following data were obtained on the sample tested:

| Product | Description | Copper Corrosion Mg./Mm. |
|---|---|---|
| A | Product A—No further processing | $1.83 \times 10^{-2}$ |
| B | Product A—Processed in accordance with this invention | $4.20 \times 10^{-3}$ |
| C | Product A—Heated 4 hours at 175–180° C | $8.10 \times 10^{-3}$ |

*Example VIII*

In order to determine further the corrosion characteristics of these materials, samples of the same materials as described above were subjected to an accelerated copper-strip test. This test is a modified version of ASTM D–130–56. The equipment used in this test was the same as that used in Example VII. The constant temperature bath, however, was maintained at 165±2° C. The copper strips were immersed one-half in the test blend, and the time required to discolor the strips was observed.

The following data were obtained on the samples tested, using this procedure:

| Product: | Discoloration time (min.) |
|---|---|
| A | 5 |
| B | Greater than 30 |
| C | 15 |

The data given in Examples VII and VIII show the superiority with respect to corrosion characteristics of the product prepared in accordance with this invention. In addition, the data shown in Example IV clearly indicate the importance of the heating step as related to the amount of aqueous layer remaining in the product. This reduction in retention of aqueous layer indicates a lowered tendency to emulsification in the washing steps. Example VI also indicates the importance of the heating step prior to the sodium sulfide treatment.

While particular embodiments of the invention have been described, it will be understood, of course, that the invention is not limited thereto, since many modificatoins may be made; and it is, therefore, contemplated to cover by the appended claims any such modifications as fall within the true spirit and scope of the invention.

The invention having thus been described, what is claimed and desired to be secured by Letters Patent is:

1. A process of stabilizing sulfurized hydrocarbons, selected from the group consisting of sulfurized olefins and sulfurized olefin-containing petroleum fractions, to render the materials less corrosive to metals, said process including the steps of (a) heating the sulfurized product after removal of any excess sulfurization agent under an inert atmosphere at temperatures of 10 to 100° C. above the temperature of sulfurization, (b) contacting the heat-treated sulfurized product after cooling to about 100° C. with aqueous alkali sulfide solutions at reflux temperatures, (c) washing the product with hot water, and (d) removing the water.

2. A process for stabilizing sulfurized non-cyclic olefinic compounds, having from 8 to 28 carbon atoms, to render the materials less corrosive to metals, said process including the steps of (a) heating the sulfurized product after removal of any excess sulfurization agent under an inert atmosphere at temperatures of 10 to 100° C. above the temperature of sulfurization, (b) contacting the heat-treated sulfurized product after cooling to about 100° C. with an aqueous alkali metal sulfide solution at reflux temperatures, (c) washing the product with hot water, and (d) removing the water.

3. The process described in claim 1, wherein the water is removed by gravity settling the product at a temperature below the boiling point of water.

4. The process described in claim 1, wherein the water is removed by heating the product to a temperature above the boiling point of water.

5. The process described in claim 1, wherein the sulfurized product, after removal of excess sulfurization agent, is heated at temperatures of 10 to 35° C. above the temperature of sulfurization.

6. The process described in claim 1 wherein the time of heating in step (a) is from 1 to 4 hours.

7. A process for stabilizing a sulfurized wax olefin, characterized as having from 8 to 28 carbon atoms and as having been sulfurized by a sulfurizing agent selected from the group consisting of elemental sulfur, sulfur halides, and mixtures thereof, to render the sulfurized olefin less corrosive to metals, said process comprising the steps of (a) heating the sulfurized product, after removal of excess sulfurization agent, for up to 4 hours under an inert atmosphere at a temperature within the range of 10 to 100° C. above the temperature of sulfurization, (b) contacting the heat-treated sulfurized olefin, after cooling to above 100° C., with an aqueous alkali metal sulfide solution at reflux temperature, (c) washing the product with hot water, and (d) removing the water.

8. The process described in claim 7, wherein the time of heating in step (a) is from 1 to 4 hours.

9. The process described in claim 7, wherein the time of heating in step (a) is from 2 to 4 hours.

10. The process described in claim 7, wherein the time of heating in step (a) is from 3 to 4 hours.

11. A process for stabilizing a sulfurized wax olefin, characterized as having from 8 to 28 carbon atoms and as having been sulfurized by a sulfurizing agent selected from the group consisting of elemental sulfur, sulfur halides, and mixtures thereof, to render the sulfurized olefin less corrosive to metals, said process comprising the steps of (a) heating the sulfurized product, after removal of excess sulfurization agent, for up to 4 hours under an inert atmosphere at a temperature within the range of 10 to 35° C. above the temperature of sulfurization, (b) contacting the heat-treated sulfurized olefin, after cooling to about 100° C., with an aqueous alkali metal sulfide solution at reflux temperature, (c) washing the product with hot water, and (d) removing the water.

12. The process described in claim 11, wherein the time of heating in step (a) is from 1 to 4 hours.

13. The process described in claim 11, wherein the time of heating in step (a) is from 2 to 4 hours.

14. The process described in claim 11, wherein the time of heating in step (a) is from 3 to 4 hours.

15. The process described in claim 12, wherein the water is removed by gravity settling the product at a temperature below the boiling point of water.

16. The process described in claim 12, wherein the water is removed by heating the product to a temperature above the boiling point of water.

17. The process described in claim 13, wherein the water is removed by gravity settling the product at a temperature below the boiling point of water.

18. The process described in claim 13, wherein the water is removed by heating the product to a temperature above the boiling point of water.

19. The process described in claim 14, wherein the water is removed by gravity settling the product at a temperature below the boiling point of water.

20. The process described in claim 14, wherein the water is removed by heating the product to a temperature above the boiling point of water.

References Cited in the file of this patent

UNITED STATES PATENTS

| | | |
|---|---|---|
| 2,445,983 | Watson | July 27, 1948 |
| 2,537,297 | Alexander | Jan. 9, 1951 |

UNITED STATES PATENT OFFICE

CERTIFICATE OF CORRECTION

Patent No. 2,959,581 November 8, 1960

Roy C. Sias

It is hereby certified that error appears in the printed specification of the above numbered patent requiring correction and that the said Letters Patent should read as corrected below.

Column 5, line 23, for "above" read -- about --.

Signed and sealed this 25th day of April 1961.

(SEAL)
Attest:

ERNEST W. SWIDER
Attesting Officer

DAVID L. LADD
Commissioner of Patents